(12) United States Patent
Paul

(10) Patent No.: US 10,817,142 B1
(45) Date of Patent: Oct. 27, 2020

(54) MACRO-NAVIGATION WITHIN A DIGITAL STORY FRAMEWORK

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 11 days.

(21) Appl. No.: 16/416,312

(22) Filed: May 20, 2019

(51) Int. Cl.
| | | |
|---|---|---|
| *G06F 3/0481* | (2013.01) | |
| *G06F 3/0482* | (2013.01) | |
| *H04N 21/472* | (2011.01) | |
| *H04L 12/58* | (2006.01) | |
| *G06F 3/0484* | (2013.01) | |
| *G06F 3/0488* | (2013.01) | |
| *G11B 27/34* | (2006.01) | |
| *H04N 21/44* | (2011.01) | |
| *H04N 21/45* | (2011.01) | |
| *G11B 27/10* | (2006.01) | |

(52) U.S. Cl.
CPC ........ *G06F 3/0482* (2013.01); *G06F 3/04842* (2013.01); *H04L 51/10* (2013.01); *H04L 51/32* (2013.01); *G06F 3/0488* (2013.01); *G11B 27/105* (2013.01); *G11B 27/34* (2013.01); *H04N 21/44008* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 8,147,251 B1 | 4/2012 | Anson | |
| 8,230,343 B2 * | 7/2012 | Logan | H04N 5/44543 |
| | | | 715/723 |
| 9,424,881 B2 * | 8/2016 | Casagrande | G11B 27/34 |
| 9,529,492 B2 * | 12/2016 | Cho | G06F 16/44 |
| 9,641,898 B2 * | 5/2017 | Bloch | H04N 21/47202 |
| 9,936,184 B2 * | 4/2018 | Kaiser | G11B 27/00 |

(Continued)

OTHER PUBLICATIONS

Notice of Allowance received for U.S. Appl. No. 16/425,908 dated Jan. 15, 2020, 22 pages.

(Continued)

*Primary Examiner* — Jordany Nunez
(74) *Attorney, Agent, or Firm* — FisherBroyles, LLP

(57) ABSTRACT

Systems and methods for creating and maintaining digital story progress bars may include (1) providing an interface that displays posts within a series of different digital stories, (2) displaying, within the interface, a progress bar including (i) a current-story section associated with a story-indicator corresponding to a current story whose posts are currently being displayed, and (ii) an upcoming-story section associated with a subsequent story-indicator corresponding to an upcoming story queued for display after the current story, (3) transitioning from displaying the posts of the current story to displaying the posts of the upcoming story, and (4) in response to displaying the posts of the upcoming story (i) altering the current-story section by replacing the story-indicator with the subsequent story-indicator and (ii) altering the upcoming-story section by replacing the subsequent story-indicator with a post-subsequent story-indicator corresponding to an additional upcoming story. Various other methods, systems, and computer-readable media are also disclosed.

20 Claims, 11 Drawing Sheets

(56) References Cited

U.S. PATENT DOCUMENTS

| | | | |
|---|---|---|---|
| 10,348,658 B2 | 7/2019 | Rodriguez et al. | |
| 10,623,831 B1 | 4/2020 | Paul | |
| 2003/0093790 A1* | 5/2003 | Logan | G06F 16/739 725/38 |
| 2008/0092168 A1* | 4/2008 | Logan | G11B 27/322 725/44 |
| 2010/0241961 A1* | 9/2010 | Peterson | G06F 16/4393 715/720 |
| 2010/0241962 A1* | 9/2010 | Peterson | G11B 27/34 715/720 |
| 2012/0087637 A1* | 4/2012 | Logan | H04N 21/458 386/241 |
| 2012/0209815 A1* | 8/2012 | Carson | H04N 5/14 707/661 |
| 2015/0220774 A1 | 8/2015 | Ebersman et al. | |
| 2015/0326912 A1* | 11/2015 | Casagrande | G11B 27/005 386/230 |
| 2016/0149956 A1* | 5/2016 | Birnbaum | H04L 63/101 726/1 |
| 2016/0155063 A1 | 6/2016 | Rich | |
| 2016/0314120 A1 | 10/2016 | Dauderman et al. | |
| 2016/0328100 A1* | 11/2016 | Rajaraman | G06F 3/04847 |
| 2017/0185581 A1 | 6/2017 | Bojja et al. | |
| 2017/0250931 A1 | 8/2017 | Ioannou et al. | |
| 2017/0308290 A1 | 10/2017 | Patel | |
| 2017/0336928 A1 | 11/2017 | Chaudhri et al. | |
| 2018/0039406 A1 | 2/2018 | Kong et al. | |
| 2018/0173692 A1 | 6/2018 | Greenberg et al. | |
| 2018/0210874 A1 | 7/2018 | Fuxman et al. | |
| 2019/0075340 A1* | 3/2019 | Hochart | H04N 21/4532 |

OTHER PUBLICATIONS

Paul, Debashish, "Systems and Methods for Digital Privacy Controls", U.S. Appl. No. 16/425,907 dated May 29, 2019, 45 pages.

Paul, Debashish, "Interactive Digital Time Display", U.S. Appl. No. 16/416,313 dated May 20, 2019, 46 pages.

Paul, Debashish, "Archive Full-Story Mode", U.S. Appl. No. 29/693,993 dated Jun. 6, 2019, 11 pages.

Paul, Debashish, "Archive Calendar Interface", U.S. Appl. No. 29/693,991 dated Jun. 6, 2019, 11 pages.

Paul, Debashish, "Archive Montage Interface", U.S. Appl. No. 29/693,989 dated Jun. 6, 2019, 11 pages.

Paul, Debashish, "Automated Social Media Replies", U.S. Appl. No. 16/425,909 dated May 29, 2019, 46 pages.

Non-Final Office Action received for U.S. Appl. No. 16/425,909 dated May 11, 2020, 28 pages.

Notice of Allowance received for U.S. Appl. No. 16/425,907 dated Apr. 9, 2020, 29 pages.

Paul, Debashish, "Systems and Methods for Digital Privacy Controls", U.S. Appl. No. 15/931,145, filed May 13, 2020, 49 pages.

* cited by examiner

MACRO-NAVIGATION WITHIN A DIGITAL STORY FRAMEWORK

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
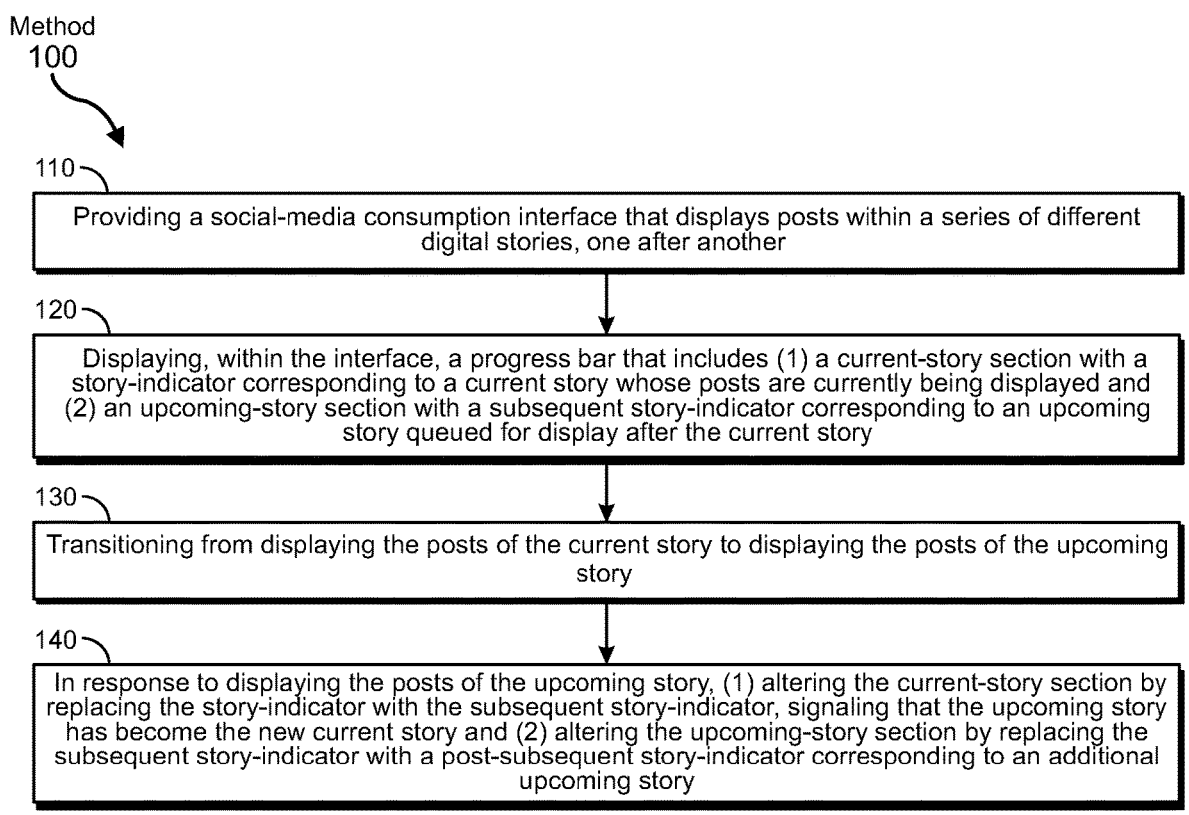
FIG. 1 is a flow diagram of an exemplary method for providing macro-navigation within a digital story framework.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Social networking platforms allow users to connect socially online. Some platforms may allow users to connect with others by enabling users to create and share digital stories. Each user's digital story may include a set of one or more posts chronicling the user's activities, thoughts, and/or opinions. These posts may be displayed one at a time (e.g., in a slideshow format). Traditional platforms may transition from displaying the posts of one story to displaying the posts of a subsequent story automatically, without giving viewers insight into which stories are in queue to be displayed next. Responding to this, the disclosed systems and methods are directed to a stories framework that provides viewers with such insight.

The disclosed framework may provide viewers of stories with insight into upcoming stories in a variety of ways. In one embodiment, the framework may include a progress bar positioned within a stories-consumption interface. The progress bar may be divided into (1) a current section configured to visually signal progress through a current story and (2) an upcoming section configured to provide information describing an upcoming story. In some examples, the upcoming section may include information about a subsequent story, in queue to be displayed after the current story, and a post-subsequent story, in queue to be displayed after the subsequent story.

In some embodiments, the progress bar may additionally improve a viewer's ability to navigate (e.g., skip around) between stories. For example, the framework may enable a viewer to (1) select an element of the upcoming section corresponding to the subsequent story to skip to the subsequent story and/or (2) select an element of the upcoming section corresponding to the post-subsequent story to skip to the post-subsequent story.

As will be explained in greater detail below, embodiments of the present disclosure may improve a data consumption flow for users consuming digital stories. The present disclosure may improve the functioning of a computer itself by improving the computer's data organization and data retrieval for digital story content.

The following will provide, with reference to FIG. 1, detailed descriptions of computer-implemented methods for creating and maintaining a digital story progress bar within a digital story interface. Detailed descriptions of corresponding example systems will also be provided in connection with FIG. 2. In addition, detailed descriptions of a corresponding story framework will be provided in connection with FIGS. 3A-3C. Finally, corresponding exemplary consumption interfaces will be provided in connection with FIGS. 4A-8.

FIG. 1 is a flow diagram of an exemplary computer-implemented method 100 for creating and maintaining digital story progress bars. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that performs one or more social networking functions as part of a social networking platform that manages server 202. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 206 of user device 204 may be a member of the social networking platform that manages server 202. In these examples, user device 204 may have installed an instance of a social networking application that operates as part of the social networking platform. Additionally or alternatively, user device 204 may have installed a browser that may navigate to one or more webpages maintained by the social networking platform. The social networking application and/or browser may provide a consumption interface 208, which may be presented via a display element of user device 204 and which may display content received from server 202.

Consumption interface 208 generally represents any type or form of interface that displays social media posts, created by users of a social networking platform, that have been selected for user 206 to view. The term "post" may refer to any type or form of social media composition created by a user of the social networking platform and posted to the social networking platform (e.g., to be viewed by one or more additional users). A post may include a variety of content including, without limitation, a digital photograph, a digital video, a gif, text, a link, etc.

A post may be selected for user 206 to view based on one or more factors. In one example, a post may be selected for user 206 because a source of the post (e.g., a user, entity, and/or group who created the post) is one of user 206's contacts. In an additional or alternative example, a post may be selected for user 206 because user 206 is following a source of the post (that is, user 206 may have affirmatively elected to receive posts from the source of the post).

Consumption interface 208 may display posts using a variety of different flows. In one embodiment, consumption interface 208 may display social media posts in a stream in which the social media posts are linearly displayed one after another. In some embodiments, consumption interface 208 may transition from displaying one post to the next automatically. Additionally or alternatively, the stream may be scrollable. In these examples, consumption interface 208 may scroll between posts unidirectionally or bidirectionally in response to receiving user scrolling input. In some examples, which will be described in greater detail below in connection with steps 120-140, consumption interface 208 may skip forward and/or backward between the posts of different stories in response to receiving user input to an interactive progress bar.

In some examples, consumption interface 208 may represent a digital story player that operates within a story framework of a social networking platform. In these examples, consumption interface 208 may display posts included within digital stories. The term "digital story" may refer to an ephemeral series of posts created by a particular source within a designated time period, which vanish after a designated length of time has passed. For example, a digital story may include posts created within the last twenty-four hours and may be intended to visually tell the story of the source's day. In this example, the digital story may be thought of as a single presentation (e.g., video and/or slideshow) of the source's day, which is continuously evolving as the source adds posts to the digital story.

In some examples, the social networking platform may automatically create a primary story for each user and/or entity who has an account with the social networking platform. In this embodiment, a primary story may be named after its corresponding user and/or entity. For example, if a user is named "Sasha Costello," her primary channel may be given the name "Sasha Costello" by default. As another example, if an entity named "Table Company" has a business account with the social networking platform, the entity's primary channel may be given the name "Table Company" by default. In addition to creating primary stories, the social networking platform may allow its users to create additional stories. In these embodiments, a user may configure an additional story as a solo-story, to which only the user (or an entity associated with the user) may contribute content, or a shared story, to which a selected set of users and/or entities may contribute content. The name of an additional story may be selected by the user creating the additional story. In some examples, the user may select a name that reflects a theme he or she wishes to associate with the additional channel (e.g., "Our Family," "Senior Field Trip," "My Daily Advice," "Breaking News," etc.).

In examples in which consumption interface 208 represents a digital story player, the posts presented within the consumption interface 208 may be thought of as a digital storybook. As a specific example, in examples in which a digital story includes posts from a source created within twenty-four hours of the current time, consumption interface 208 may be thought of as a storybook of the last twenty-four hours.

Figure 3A:
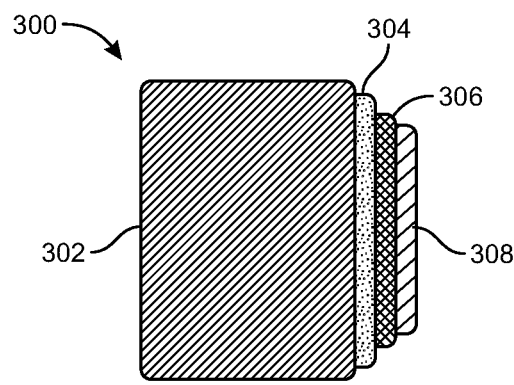
FIGS. 3A-3C are a series of block diagrams that conceptually illustrate a storybook framework.
Figure 3B:
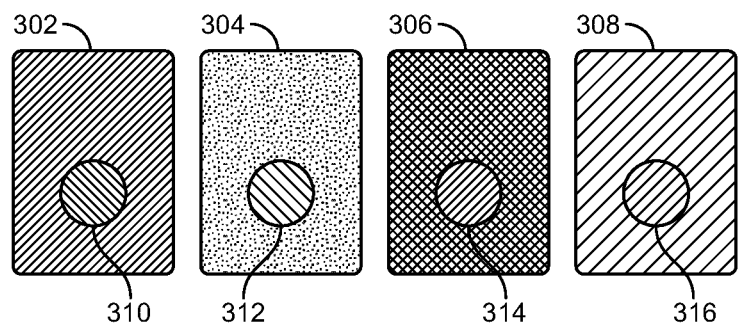
Figure 3C:
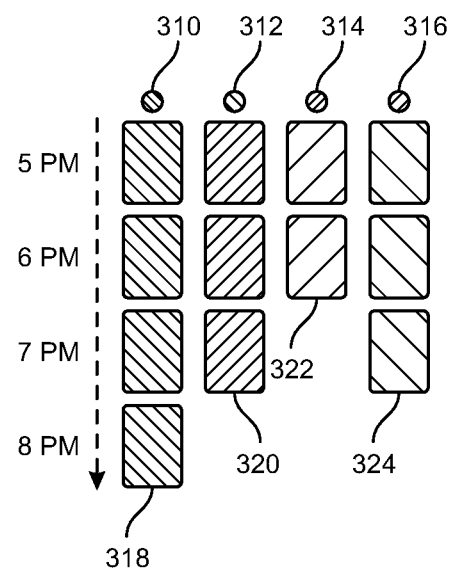

FIGS. 3A-3C provide a conceptual depiction of a digital storybook 300, depicted in FIG. 3A, assembled by a social networking platform for user 206. Digital storybook 300 may include a series of different digital stories selected to be displayed to user 206, such as a first digital story 302, a second digital story 304, a third digital story 306, and a fourth digital story 308, each of which has been expanded out in FIG. 3B. Each digital story within digital storybook 300 may correspond to a different source and may include a series of posts generated and/or added by its corresponding source. As a specific example, first digital story 302 may correspond to a first source 310 (as illustrated in FIG. 3B) and may include a series of four posts (posts 318 in FIG. 3C) generated by first source 310. Then, second digital story 304 may correspond to a second source 312 (as illustrated in FIG. 3B) and may include a series of three posts (posts 320 in FIG. 3C) generated by second source 312. Then, third digital story 306 may correspond to a third source 314 (as illustrated in FIG. 3B) and may include a series of two posts (posts 322 in FIG. 3C) generated by third source 314. Finally, fourth digital story 308 may correspond to a fourth source 316 (as illustrated in FIG. 3B) and may include a series of three posts generated by fourth source 316 (posts 324 in FIG. 3C).

In examples in which a digital story may represent a collection of posts generated by a particular source within a designated time frame (e.g., twenty-four hours), the posts of the digital stories within digital storybook 300 may be organized by time (e.g., with earlier posts being displayed before later posts), as illustrated in FIG. 3C. In some such examples, the posts may be organized based on each post's creation time. In additional or alternative examples, the posts may be organized according to a timestamp associated with content included in a post. For example, posts that include images may be organized based on a capture time of an image.

In one embodiment, consumption interface 208 may be configured to show each post within a given digital story prior to showing posts of a subsequent digital story (e.g., unless consumption interface 208 receives user input that skips one or more posts within a digital story). To summarize components of one embodiment of a story framework, a digital storybook may refer to a collection of digital stories selected for a particular user (e.g., user 206), a digital story may refer to a collection of posts generated by a particular source (e.g., author), and a post may refer to any type or form of story composition added to a digital story.

Figure 2:
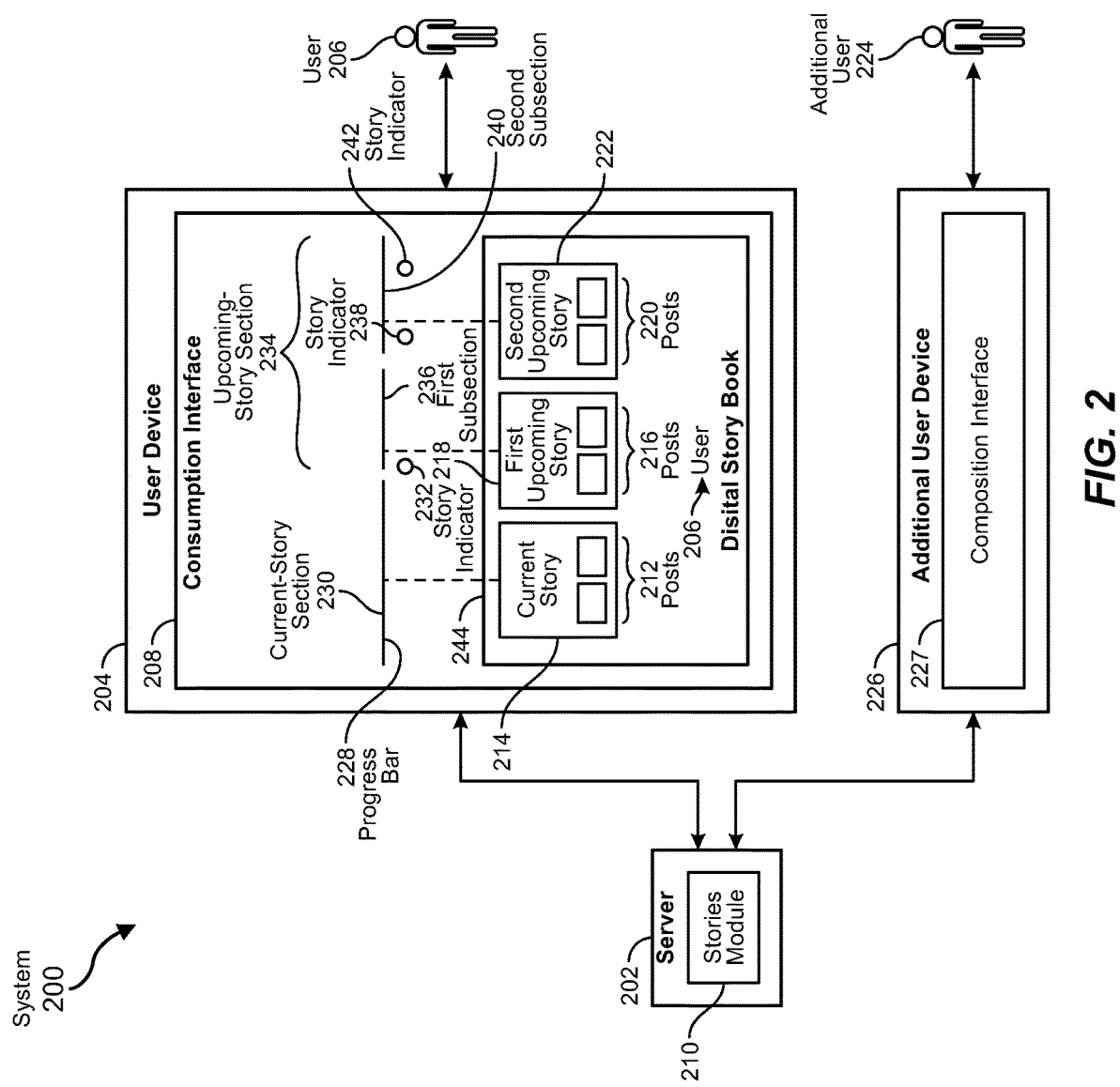
FIG. 2 is a block diagram of an exemplary system for providing macro-navigation within a digital story framework.

Returning to FIG. 1, at step 110, one or more of the systems described herein may provide a social-media consumption interface that displays posts within a series of different digital stories, one after another. For example, as illustrated in FIG. 2, a stories module 210 may digitally provide consumption interface 208 to user 206 via a display element of user device 204. At a current moment in time, stories module 210 may be displaying posts 212 from a current story 214 and may have posts 216 from a first upcoming story 218 queued for display after posts 212 and posts 220 from a second upcoming story 222 queued for display after posts 220.

In one example, current story 214 may correspond to an additional user 224 of an additional user device 226. That is, current story 214 may represent a story dedicated to posts created by additional user 224 (e.g., created using a composition interface 227 provided by the same social networking platform providing consumption interface 208 to user 206). In this example, current story 214 may be configured to include posts created and/or added to current story 214 by additional user 224 within a designated time period (e.g., twenty-four hours).

Figure 4A:
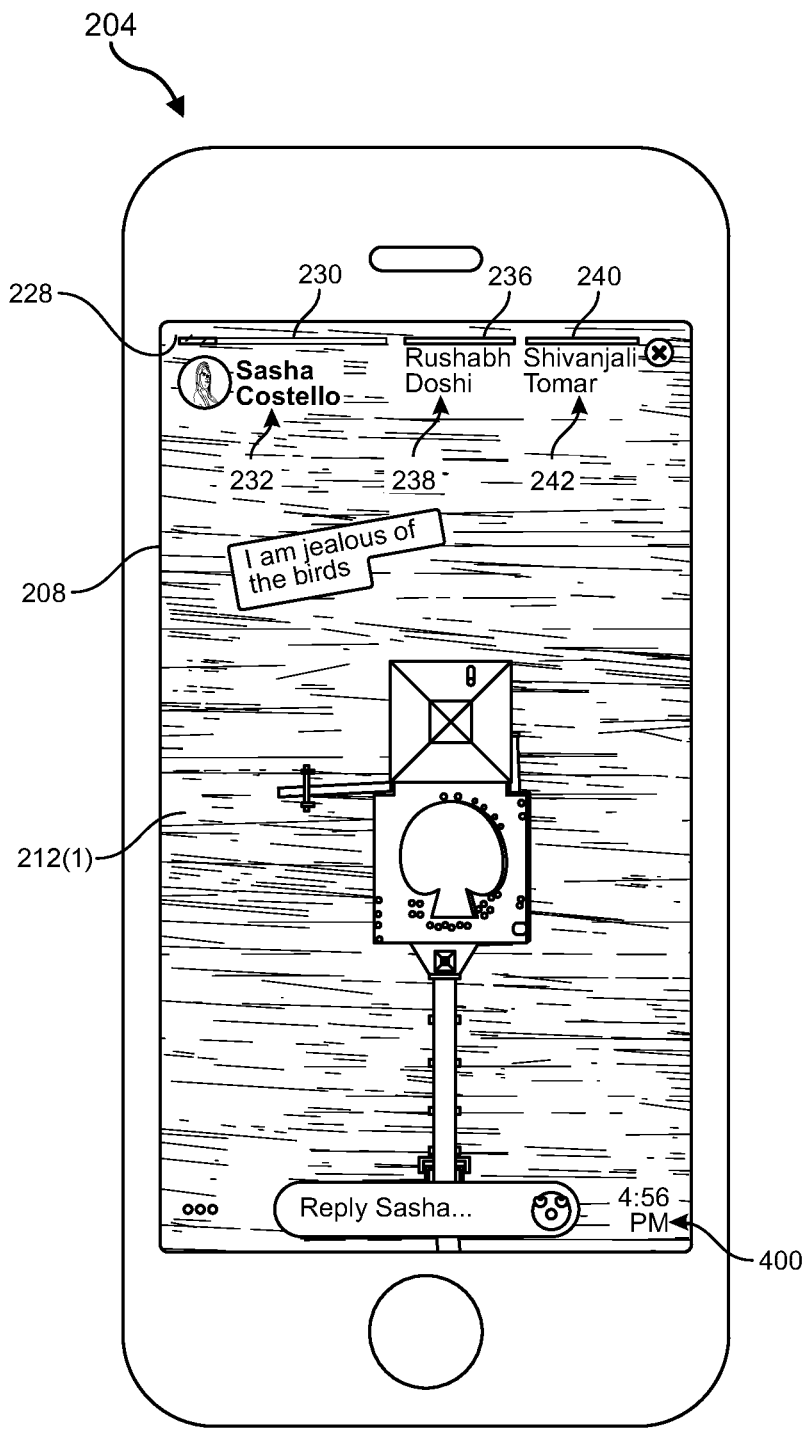
FIGS. 4A-4B are an illustration of an exemplary first post in a digital story being displayed in a consumption interface.
Figure 4B:
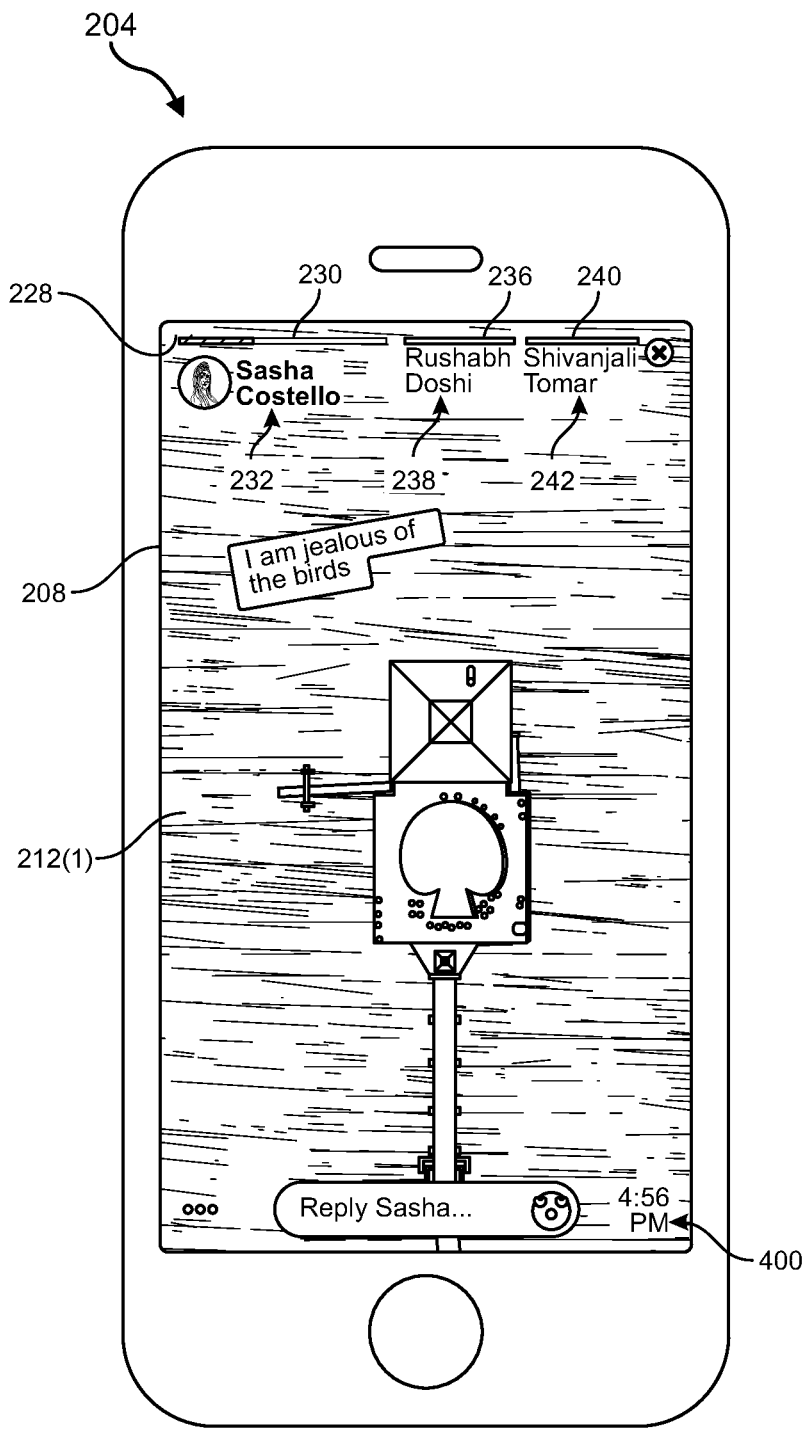
Figure 5A:
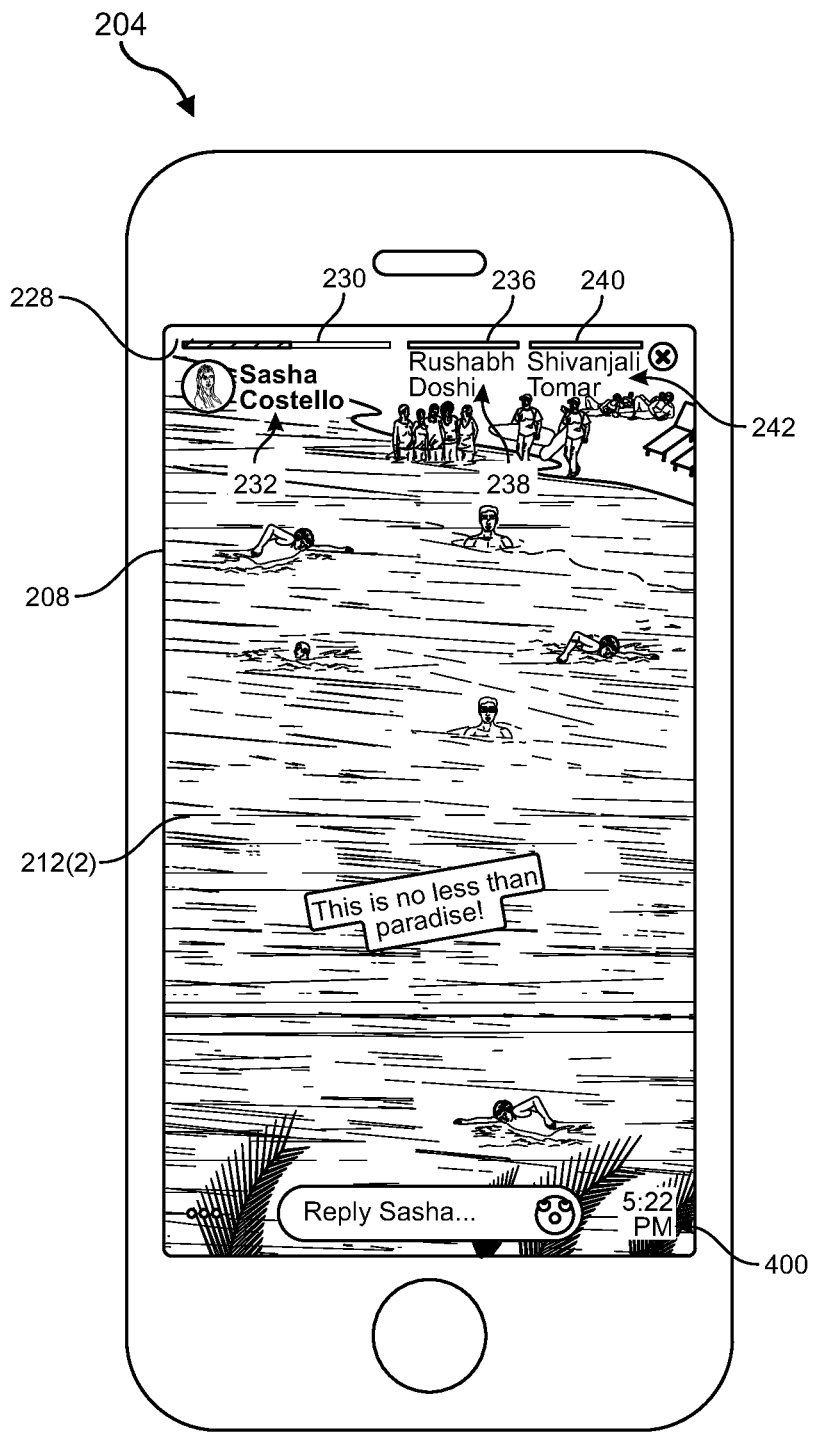
FIGS. 5A-5B are an illustration of an exemplary second post in a digital story being displayed in a consumption interface.
Figure 5B:
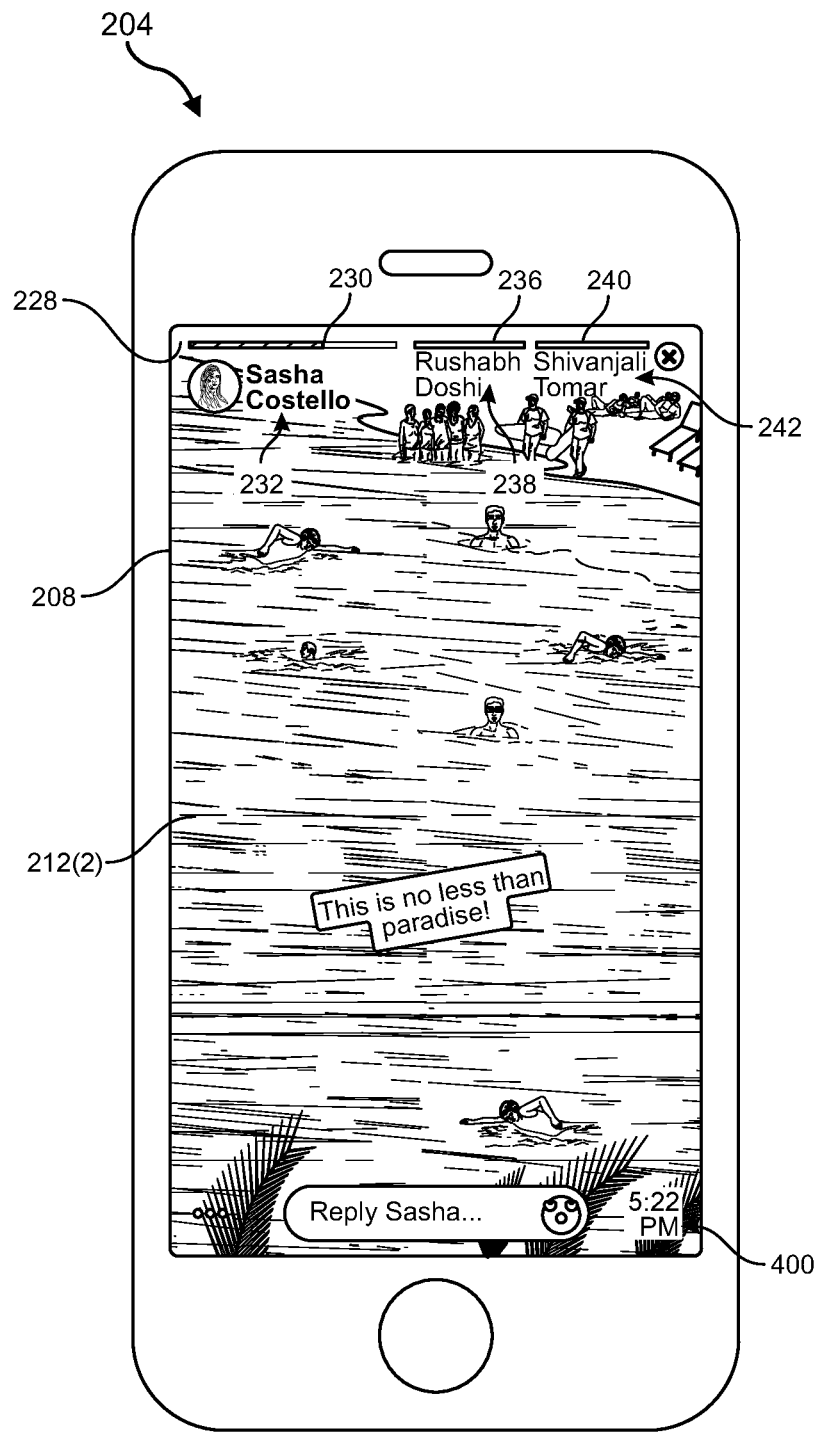
Figure 6A:
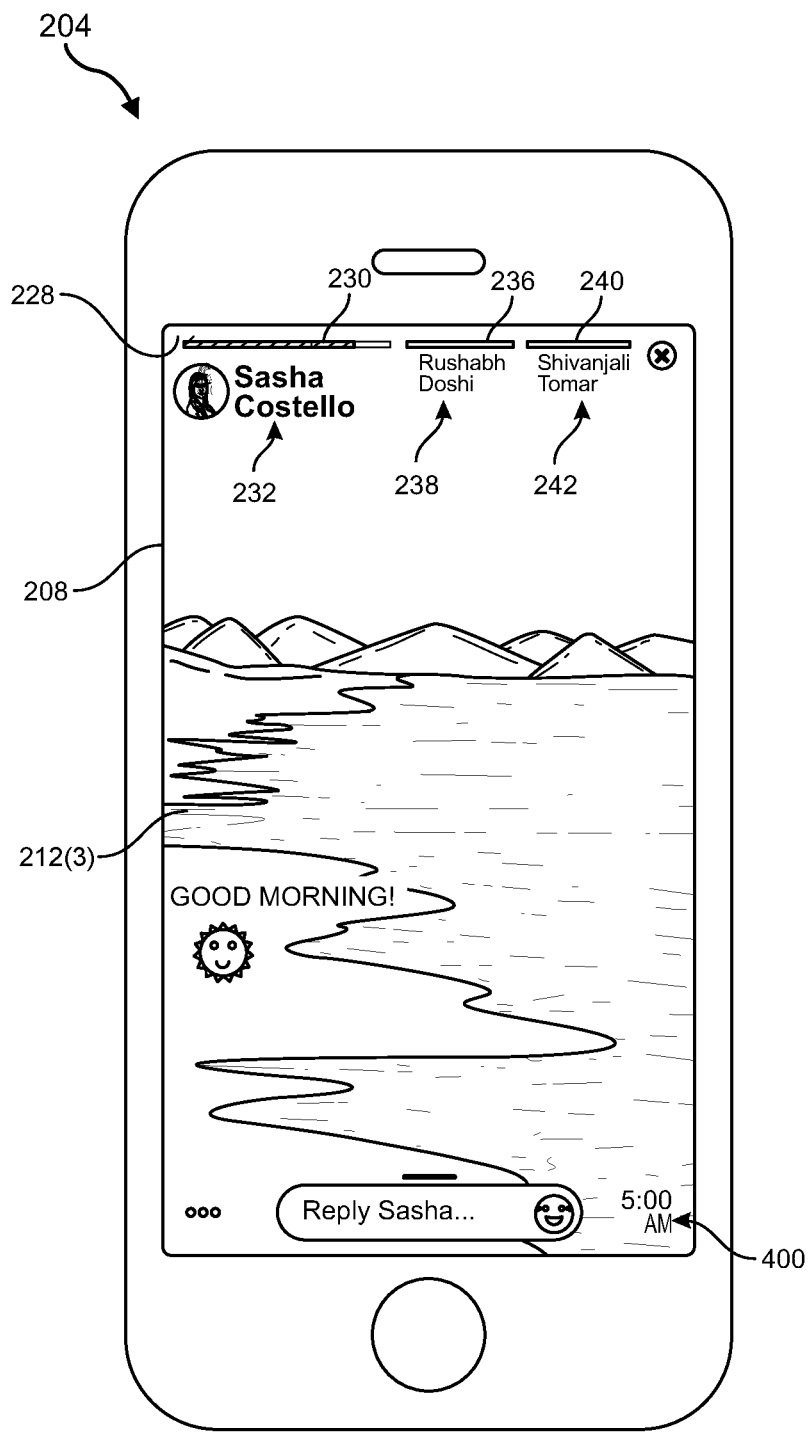
FIGS. 6A-6B are an illustration of an exemplary third post in a digital story being displayed in a consumption interface.
Figure 6B:
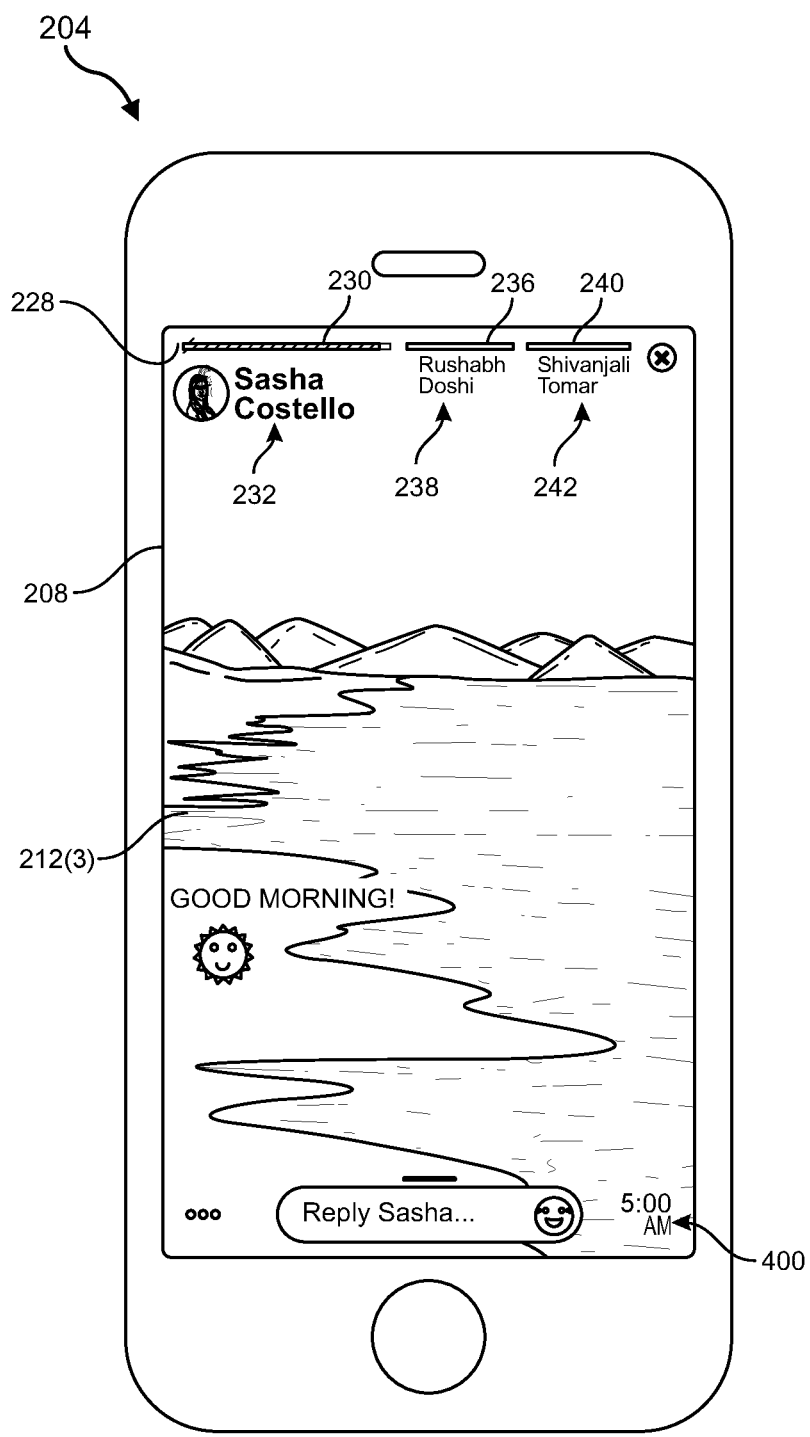

FIGS. 4A-6B provide a specific example of current story 214 in which current story 214 includes three posts: a first post, illustrated in FIGS. 4A-4B, a second post, illustrated in FIGS. 5A-5B, and a third post, illustrated in FIGS. 6A-6B. In this example, stories module 210 may display, within consumption interface 208, the first post illustrated in FIGS. 4A-4B, followed by the second post illustrated in FIGS. 5A-5B, followed by third post illustrated in FIGS. 6A-6C. Stories module 210 may display each post for a predetermined length of time (e.g., 2 seconds, 10 seconds, etc.). Stories module 210 may transition from one post to the next in response to a variety of triggers. In one example, stories module 210 may transition from one post to the next automatically (i.e., after the current post has displayed for the predetermined length of time). Additionally, in some examples stories module 210 may transition from one post to the next in response to receiving user input (e.g., user scrolling input and/or user tapping input to a touchscreen of user device 204).

Stories module 210 may order the posts within posts 212 in a variety of ways. For example, as shown in FIGS. 4A-6B, stories module 210 may display posts 212 in an ascending chronological order, with posts added at an earlier time displayed prior to posts added at a later time. In an alternate example, stories module 210 may display posts 212 in a descending chronological order, in which more recently added posts are displayed prior to displaying older posts. In additional or alternative examples, posts 212 may be organized based on a time associated with content within a post (e.g., a time at which a digital picture was taken, a time at which a website being linked to was created, etc.).

Returning to FIG. 1, at step 120, one or more of the systems described herein may display a progress bar within the consumption interface. The progress bar may include (1) a current-story section with a story-indicator corresponding to a current story whose posts are currently being displayed and (2) an upcoming-story section with a subsequent story-indicator corresponding to an upcoming story queued for display after the current story. For example, as illustrated in FIG. 2, stories module 210 may display progress bar 228 within consumption interface 208. Progress bar 228 may include (1) a current-story section 230 with a story-indicator 232 corresponding to current story 214 whose posts 212 are currently being displayed and (2) an upcoming-story section 234. In the embodiment illustrated in FIG. 2, upcoming-story section 234 may include multiple subsections (e.g., a first subsection 236 with a story-indicator 238 corresponding to first upcoming story 218 and a second subsection 240 with a story-indicator 242 corresponding to second upcoming story 222). FIGS. 4A-8 provide an illustration of an exemplary depiction of progress bar 228 in one embodiment.

Progress bar 228 may generally represent any type or form of graphical line, positioned within a consumption interface displaying posts within the stories of a digital storybook, that depicts progress within a digital story and/or within a digital storybook (e.g., within a digital storybook 244 of user 206). Progress bar 228 may take of a variety of forms. In some examples, as illustrated in FIG. 2, progress bar 228 may take the form of a rectangular line. In other examples, progress bar 228 may take the form of a graphical wave. Progress bar 228 may be positioned within consumption interface 208 at any orientation. For example, progress bar 228 may represent a horizontally oriented bar (as shown in FIGS. 4A-8), a vertically oriented bar, a canted bar, etc.

As mentioned above, progress bar 228 may include two sections: current-story section 230 and upcoming-story section 234. In some examples, progress bar 228 may be evenly divided between both sections, with current-story section 230 running the length of the first half of progress bar 228 and upcoming-story section 234 running the length of the second half of progress bar 228. In other examples, a greater portion of progress bar 228 may be allocated to one of the two sections. Each of the sections may perform a functionality, each of which will be described, in turn.

First, current-story section 230 may be dedicated to providing information relating to current story 214. In some examples, current-story section 230 may visually convey an amount of progression through posts 212 of current story 214. For example, a portion of current-story section 230 that is filled (e.g., bolded) may correspond to a percentage and/or number of posts 212 that have displayed relative to a percentage and/or number of posts 212 that are still in queue to be displayed. Additionally or alternatively, a portion of current-story section 230 that is filled (e.g., bolded) may correspond to an amount or percentage of time that is left before posts 212 finish displaying. In some examples, current-story section 230 may represent a single unbroken bar that may be filled at a continual speed as posts 212 are displayed (e.g., instead of current-story section 230 being broken into a series of discrete sections, each of which corresponds to a different post within posts 212).

FIGS. 4A-6B illustrate an embodiment in which current-story section 230 is a single unbroken bar that is continually filled as the display of posts 212 progresses. As shown in these figures, a percentage of current-story section 230 that is filled may increase as time goes by. Thus, a first post 212(1) within posts 212 may display from Time 1 (illustrated in FIG. 4A) until Time 2 (illustrated in FIG. 4B) and current-story section 230 may continue to fill such that a greater percentage of current-story section 230 is filled at Time 2 relative to Time 1. A similar progression may be observed between FIG. 4B and FIG. 5A, FIG. 5A and FIG. 5B, FIG. 5B and FIG. 6A, and FIG. 6A and FIG. 6B. In the embodiment illustrated in FIGS. 4A-6B, posts 212 include three posts (i.e., a first post 212(1), a second post 212(2), and a third post 212(3)) and the first third of current-story section 230 may be filled as first post 212(1) is displaying, the second third may be filled as second post 212(2) is displaying, and the final third may be filled as third post 212(3) is displaying.

In one embodiment, current-story section 230 may be visually associated with a story-indicator 232 that indicates which story is currently being displayed (i.e., the story's source). In some examples, story-indicator 232 may include a name of current story 214 (e.g., the name "Sasha Costello" in FIGS. 4A-6B). Additionally or alternatively, story-indicator 232 may include a profile picture associated with current story 214.

Next, upcoming-story section 234 may be dedicated to providing information relating to an upcoming story (i.e., a story in queue to be displayed after current story 214). In some examples (not illustrated), upcoming-story section 234 may be dedicated to a single upcoming story (e.g., a story in queue to be displayed immediately following current story 214). In other examples, upcoming-story section 234 may provide information related to multiple upcoming stories. In these examples, upcoming-story section 234 may include various subsections, each of which may be dedicated to a different upcoming story. FIG. 2 illustrates an embodiment in which upcoming-story section 234 includes two subsections: a first subsection 236, corresponding to a first upcoming story 218 queued for display immediately following current story 214, and a second subsection 240, corresponding to second upcoming story 222 queued for display immediately following first upcoming story 218.

In some examples, upcoming-story section 234 may include one or more story-indicators. In examples in which upcoming-story section 234 includes multiple subsections, each subsection may include a story-indicator that indicates a story to which the subsection corresponds. In FIG. 2, first subsection 236 may include story-indicator 238, which indicates first upcoming story 218, and second subsection 240 may include story-indicator 242, which indicates second upcoming story 222. The story-indicators associated with each digital story (i.e., first upcoming story 218 and second upcoming story 222) may have a text identifying a name of the digital story. Additionally or alternatively, the indicators may have a graphic associated with each digital story (e.g., a profile picture).

In some embodiments, upcoming-story section 234 may, in addition to providing information about one or more upcoming stories, be used to skip ahead to the upcoming stories. In one such embodiment, upcoming-story section 234 (and/or each subsection within upcoming-story section 234) may be selectable, as will be described in greater detail below in connection with steps 130 and 140.

Figure 7:
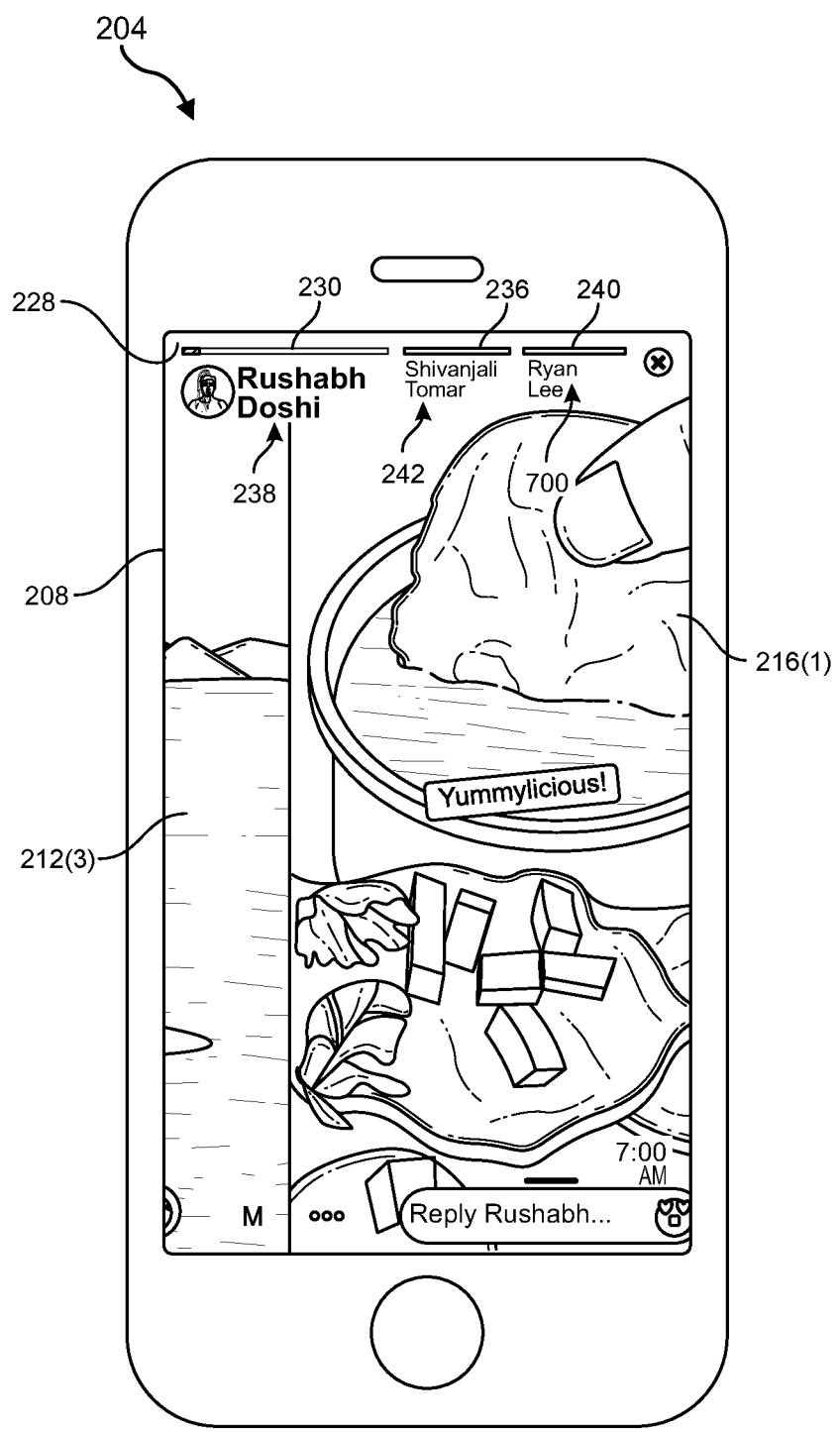
FIG. 7 is an illustration of an exemplary transition between the final post of the digital story illustrated in FIGS. 4A-6B and the first post of an additional digital story.

Returning to FIG. 1, at step 130, one or more of the systems described herein may transition from displaying the posts of the current story to displaying the posts of the upcoming story. For example, stories module 210 may transition from displaying posts 212 of current story 214 to displaying posts 216 of first upcoming story 218 and/or to displaying posts 220 of second upcoming story 222. FIG. 7 provides an exemplary illustration of a transition from displaying a final post within posts 212 of current story 214 (post 212(3)) to displaying a first post of posts 216 of first upcoming story 218 (post 216(1)).

Stories module 210 may transition from displaying posts 212 of current story 214 to displaying posts from an upcoming story in response to a variety of triggers. In some examples, the transition may be automatic. For example, stories module 210 may automatically transition from displaying posts 212 to displaying posts 216 or posts 220 after the final post of current story 214 has displayed. In other examples, stories module 210 may transition to displaying posts 216 or posts 220 in reaction to receiving user input. In this example, prior to displaying at least one of posts 212 within current story 214, stories module 210 may (1) receive user input selecting upcoming-story section 234 and/or a subsection of upcoming-story section 234 and (2) display the posts corresponding to upcoming-story section 234 and/or the selected subsection in response.

Stories module 210 may signal the transition from displaying posts 212 of current-story section 230 to displaying posts 216 or posts 220 in a variety of ways. In some examples, stories module 210 may signal the transition by sliding each story-indicator out of view or to a new position. This sliding motion may coincide with a sliding transition from the final post within posts 212 to the initial post within posts 216 or posts 220.

Using FIG. 7 as a specific example in which stories module 210 transitions to displaying posts 216, stories module 210 may slide each story-indicator to the left such that story-indicator 232 slides out of view, story-indicator 238 slides into the position previously taken by story-indicator 232, story-indicator 242 slides into the position previously taken by story-indicator 238, and a new story-indicator (corresponding to a story in queue to be displayed after second upcoming story 222) slides into the position previously taken by story-indicator 242.

In another specific example (not illustrated), in which stories module 210 transitions to displaying posts 220, stories module 210 may slide each story-indicator to the left such that story-indicator 232 and story-indicator 238 slide out of view, story-indicator 242 slides into the position previously taken by story-indicator 232, the new story-indicator (corresponding to a new story in queue to be displayed after second upcoming story 222) slides into the position previously taken by story-indicator 238, and an additional new story-indicator (corresponding to an additional new story in queue to be displayed after the new story) slides into the position previously taken by story-indicator 242.

In some embodiments, stories module 210 may additionally signal the transition with a temporary pause, a temporary resistance to user input (e.g., scrolling input), a temporary application of a filter over the face of consumption interface 208 (e.g., a translucent color that covers the face of consumption interface 208), and/or a temporary change in a background of consumption interface 208 and/or a size of one or more elements displayed within consumption interface 208.

Figure 8:
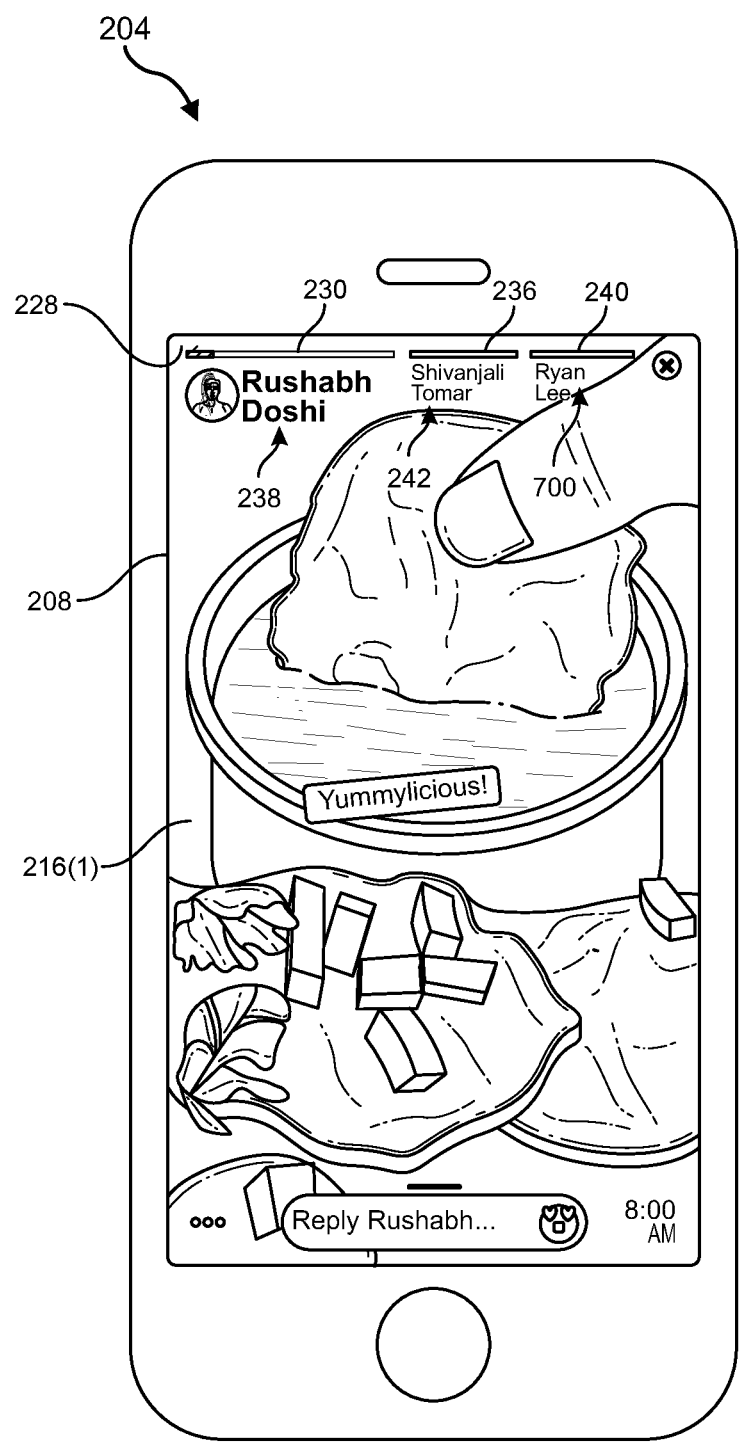
FIG. 8 is an illustration of an exemplary first post of the additional digital story introduced in FIG. 7.

Finally, at step 140, one or more of the systems described herein may, in response to displaying the posts of the upcoming story, (1) alter the current-story section by replacing the story-indicator with the subsequent story-indicator, signaling that the upcoming story has become the new current story, and (2) alter the upcoming-story section by replacing the subsequent story-indicator with the post-subsequent story-indicator corresponding to the additional upcoming story. For example, as illustrated in FIG. 2, in examples in which stories module 210 transitions to displaying posts 216 of first upcoming story 218, stories module 210 may, in response, (1) replace story-indicator 232 with story-indicator 238 and (2) replace story-indicator 238 with story-indicator 242. FIG. 8 provides an exemplary illustration, in which stories module 210 transitions to displaying posts 216 of first upcoming story 218, of altering current-story section 230 by replacing story-indicator 232 with story-indicator 238, signaling that first upcoming story 218 has become the new current story.

In examples in which stories module 210 transitions to displaying posts 220 of second upcoming story 222, stories module 210 may, in response, (1) replace story-indicator 232 with story-indicator 242, (2) replace story-indicator 238 with a story-indicator of a third upcoming story in queue to be displayed after second upcoming story 222, and (3) replace story-indicator 242 with a story-indicator of a fourth upcoming story in queue to be displayed after the third upcoming story.

In some examples, consumption interface 208 may include various additional elements, in addition to progress bar 228. The additional elements may be configured to emphasize time as a unifying theme within each digital story. For example, consumption interface 208 may include a stationary time graphic (e.g., a graphic of a split-flap time display). In this example, a time displayed by the stationary time graphic may change each time consumption interface 208 transitions to displaying a different post within a digital story to display a time corresponding to the different post. In some examples, the stationary time graphic may display the time at which a current post (i.e., a post currently on display) was added to its digital story. In other examples, the stationary time graphic may display a time associated with a current post's content (e.g., a time at which an image included within the current post was captured).

Using FIGS. 4A-6B as a specific example, in FIGS. 4A-4B a stationary graphic 400 may indicate the time "4:56 PM," a time corresponding to the first post, while the first post within current story 214 is being displayed. Then, in FIGS. 5A-5B, graphic 400 may indicate the time "5:22 PM," a time corresponding to the second post, while the second post within current story 214 is being displayed. Finally, in FIGS. 6A-6B, graphic 400 may indicate the time "5:00 AM," a time corresponding to the third post, while the third post within current story 214 is being displayed.

As described throughout the instant disclosure, the present disclosure provides systems and methods for creating and maintaining a digital story progress bar within a digital story interface. In one example, a computer-implemented method may include providing a social-media consumption interface that displays posts within a series of different digital stories, one after another. After providing the interface, the method may include displaying, within the interface, a progress bar. The progress bar may include (1) a current-story section associated with a story-indicator corresponding to a current story whose posts are currently being displayed and (2) an upcoming-story section associated with a subsequent story-indicator corresponding to an upcoming story queued for display after the current story. Then, the method may include transitioning from displaying the posts of the current story to displaying the posts of the upcoming story. Finally, in response to displaying the posts of the upcoming story, the method may include (1) altering the current-story section by replacing the story-indicator with the subsequent story-indicator, signaling that the upcoming story has become the new current story and (2) altering the upcoming-story section by replacing the subsequent story-indicator with a post-subsequent story-indicator corresponding to an additional upcoming story.

In some examples, the method may further include, as the interface progresses through the posts of the current story, digitally filling the current-story section to visually convey the progression. In these examples, the current-story section may include a single unbroken bar and digitally filling the current-story section may include digitally filling the current-story section at a continual speed.

In one embodiment, the method may further include (1) prior to displaying at least one of the posts within the current story, receiving user input selecting the upcoming-story section of the progress bar, and (2) transitioning from displaying the posts of the current digital story to displaying the posts of the upcoming story in response to receiving the user input, prior to displaying the at least one post within the current story.

In some examples, the upcoming-story section may include a first subsection, corresponding to a first upcoming story queued for display immediately following the current story, and a second subsection, corresponding to a second upcoming story queued for display immediately following the first upcoming story. In one such example, the upcoming story may represent the first upcoming story and the additional upcoming story may represent the second upcoming story. In another example, the upcoming story may represent the second upcoming story and the additional upcoming story may represent a digital story in queue to be displayed after the second upcoming story. In some examples, (1) the current-story section may run the length of the first half of the progress bar, (2) the upcoming-story section may run the length of the second half of the progress bar, (3) the first subsection may run the length of the first half of the upcoming-story section, and (4) the second subsection may run the length of the second half of the upcoming-story section.

In one embodiment, the method may further include providing, within the interface, a graphic of a split-flap time display and each time the interface transitions to displaying a new post within a story, changing a time displayed by the split-flap time display to a time corresponding to the new post. In some examples, each digital story with the series of different digital stories may correspond to a different source. In these examples, the different sources may include an individual user, a group of users, a theme, and/or an organization.

In one example, a corresponding system for implementing the above-described method may include a stories module, stored in memory that (1) provides a social media consumption interface that displays posts within a series of different digital stories, one after another, (2) displays, within the interface, a progress bar that includes (i) a current-story section associated with a story-indicator that indicates a current story whose posts are currently being displayed and (ii) an upcoming-story section associated with a subsequent story-indicator that indicates an upcoming story queued for display after the current story, (3) transitions from displaying the posts of the current story to displaying the posts of the upcoming story, and, (4) in response to displaying the posts of the upcoming story, (i) alters the current-story section by replacing the story-indicator with the subsequent story-indicator, signaling that the upcoming story has become the new current story and (ii) alters the upcoming-story section by replacing the subsequent story-indicator with a post-subsequent story-indicator corresponding to an additional upcoming story. The system may also include a physical processor configured to execute the stories module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a social media consumption interface that displays posts within a series of different digital stories, one after another, (2) display, within the interface, a progress bar that includes (i) a current-story section associated with a story-indicator that indicates a current story whose posts are currently being displayed and (ii) an upcoming-story section associated with a subsequent story-indicator that indicates an upcoming story queued for display after the current story, (3) transition from displaying the posts of the current story to displaying the posts of the upcoming story, and, (4) in response to displaying the posts of the upcoming story, (i) alter the current-story section by replacing the story-indicator with the subsequent story-indicator, signaling that the upcoming story has become the new current story and (ii) alter the upcoming-story section by replacing the subsequent story-indicator with a post-subsequent story-indicator corresponding to an additional upcoming story.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    providing a social media consumption interface that displays posts within a series of different digital stories, one after another;
    displaying, within the interface, a progress bar comprising:
        a current-story section: which runs the length of the first half of the progress bar, associated with a story-indicator corresponding to a current story whose posts are currently being displayed; and
        an upcoming-story section, which runs the length of the second half of the progress bar, associated with a subsequent story-indicator corresponding to an upcoming story queued for display after the current story, the upcoming-story section comprising (1) a first subsection, corresponding to a first upcoming story queued for display immediately following the current story, which runs the length of the first half of the upcoming-story section, and (2) a second subsection, corresponding to a second upcoming story queued for display immediately following the first upcoming story, which runs the length of the second half of the upcoming-story section;
    transitioning from displaying the posts of the current story to displaying the posts of the upcoming story; and
    in response to displaying the posts of the upcoming story:
        altering the current-story section by replacing the story-indicator with the subsequent story-indicator, signaling that the upcoming story has become the new current story; and
        altering the upcoming-story section by replacing the subsequent story-indicator with a post-subsequent story-indicator corresponding to an additional upcoming story.

2. The computer-implemented method of claim 1, further comprising, as the interface progresses through the posts of the current story, digitally filling the current-story section to visually convey the progression.

3. The computer-implemented method of claim 2, wherein:
    the current-story section comprises a single unbroken bar; and filling the current-story section comprises filling the current-story section at a continual speed.

4. The computer-implemented method of claim 1, further comprising:
prior to displaying at least one of the posts within the current story, receiving user input selecting the upcoming-story section of the progress bar; and
transitioning from displaying the posts of the current story to displaying the posts of the upcoming story in response to receiving the user input, prior to displaying the at least one post within the current story.

5. The computer-implemented method of claim 4, wherein:
receiving user input selecting the upcoming-story section comprises receiving user input selecting the first subsection;
the upcoming story comprises the first upcoming story; and
the additional upcoming story comprises the second upcoming story.

6. The computer-implemented method of claim 4, wherein:
receiving user input selecting the upcoming-story section comprises receiving user input selecting the second subsection;
the additional upcoming story comprises a digital story in queue to be displayed after the second upcoming story.

7. The computer-implemented method of claim 1, wherein:
the transition from displaying the posts of the current story to displaying the posts of the upcoming story is automatic;
the upcoming story comprises the first upcoming story; and
the additional upcoming story comprises the second upcoming story.

8. The computer-implemented method of claim 1, further comprising signaling the transition with at least one of:
a temporary pause in the display of posts; or
a temporary resistance to user scrolling input.

9. The computer-implemented method of claim 1, further comprising:
providing, within the interface, a graphic of a split-flap time display; and
each time the interface transitions to displaying a new post within a story, changing a time displayed by the split-flap time display to a time corresponding to the new post.

10. The computer-implemented method of claim 1, wherein each digital story within the series of different digital stories corresponds to a different source.

11. The computer-implemented method of claim 10, wherein the different sources comprise at least one of:
an individual user;
a group of users;
a theme; or
an organization.

12. A system comprising:
a stories module, stored in memory, that:
provides a social media consumption interface that displays posts within a series of different digital stories, one after another;
displays, within the interface, a progress bar comprising:
a current-story section, which runs the length of the first half of the progress bar, associated with a story-indicator that indicates a current story whose posts are currently being displayed; and
an upcoming-story section, which runs the length of the second half of the progress bar, associated with a subsequent story-indicator that indicates an upcoming story queued for display after the current story, the upcoming-story section comprising (1) a first subsection, corresponding to a first upcoming story queued for display immediately following the current story, which runs the length of the first half of the upcoming-story section, and (2) a second subsection, corresponding to a second upcoming story queued for display immediately following the first upcoming story, which runs the length of the second half of the upcoming-story section;
transitions from displaying the posts of the current story to displaying the posts of the upcoming story; and
in response to displaying the posts of the upcoming story:
alters the current-story section by replacing the story-indicator with the subsequent story-indicator, signaling that the upcoming story has become the new current story; and
alters the upcoming-story section by replacing the subsequent story-indicator with a post-subsequent story-indicator corresponding to an additional upcoming story; and
at least one physical processor configured to execute the stories module.

13. The system of claim 12, wherein, as the interface progresses through the posts of the current story, the stories module digitally fills the current-story section to visually convey the progression.

14. The system of claim 13, wherein:
the current-story section comprises a single unbroken bar; and
the stories module fills the current-story section by filling the current-story section at a continual speed.

15. The system of claim 12, further comprising:
prior to displaying at least one of the posts within the current story, the stories module receives user input selecting the upcoming-story section of the progress bar; and
the stories module transitions from displaying the posts of the current 4*gi-t*-story to displaying the posts of the upcoming story in response to receiving the user input, prior to displaying the at least one post within the current story.

16. The system of claim 15, wherein:
the stories module receives the user input selecting the upcoming-story section by receiving user input selecting the first subsection;
the upcoming story comprises the first upcoming story; and
the additional upcoming story comprises the second upcoming story.

17. The system of claim 15, wherein:
the stories module receives user input selecting the upcoming-story section by receiving user input selecting the second subsection;
the upcoming story comprises the second upcoming story; and
the additional upcoming story comprises a digital story in queue to be displayed after the second upcoming story.

18. The system of claim 12, wherein:
the transition from displaying the posts of the current story to displaying the posts of the upcoming story is automatic;
the upcoming story comprises the first upcoming story; and
the additional upcoming story comprises the second upcoming story.

19. The system of claim 16, wherein each digital story within the series of different digital stories corresponds to a different source.

20. A non-transitory computer-readable medium comprising one or more computer-readable instructions that, when executed by at least one processor of a computing device, cause the computing device to:
provide a social media consumption interface that displays posts within a series of different digital stories, one after another;
display, within the interface, a progress bar comprising:
a current-story section, which runs the length of the first half of the progress bar, associated with a story-indicator that indicates a current story whose posts are currently being displayed; and
an upcoming-story section, which runs the length of the second half of the progress bar, associated with a subsequent story-indicator that indicates an upcoming story queued for display after the current story, the upcoming-story section comprising (1) a first subsection, corresponding to a first upcoming story queued for display immediately following the current story, which runs the length of the first half of the upcoming-story section, and (2) a second subsection, corresponding to a second upcoming story queued for display immediately following the first upcoming story, which runs the length of the second half of the upcoming-story section;
transition from displaying the posts of the current story to displaying the posts of the upcoming story; and
transition from displaying the posts of the current story to displaying the posts of the upcoming story; and
in response to displaying the posts of the upcoming story:
alter the current-story section by replacing the story-indicator with the subsequent story-indicator, signaling that the upcoming story has become the new current story; and
alter the upcoming-story section by replacing the subsequent story-indicator with a post-subsequent story-indicator corresponding to an additional upcoming story.

* * * * *